US012630754B2

(12) United States Patent
Yuan et al.

(10) Patent No.: US 12,630,754 B2
(45) Date of Patent: May 19, 2026

(54) SELF-HEALING ANTI-ICING ALUMINUM CONDUCTOR STEEL-REINFORCED WITH COMPOSITE MICROPOROUS STRUCTURE AND PREPARATION METHOD THEREOF

(71) Applicant: CHONGQING UNIVERSITY, Chongqing (CN)

(72) Inventors: Yuan Yuan, Chongqing (CN); Guoyong Liu, Chongqing (CN); Ruijin Liao, Chongqing (CN); Huiying Xiang, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 860 days.

(21) Appl. No.: 17/868,726

(22) Filed: Jul. 19, 2022

(65) Prior Publication Data

US 2023/0023650 A1 Jan. 26, 2023

(30) Foreign Application Priority Data

Jul. 20, 2021 (CN) .......................... 202110820385.6

(51) Int. Cl.
C09K 3/18 (2006.01)
C23F 13/00 (2006.01)

(52) U.S. Cl.
CPC .............. C09K 3/18 (2013.01); C23F 13/005 (2013.01); C23F 2213/30 (2013.01)

(58) Field of Classification Search
None
See application file for complete search history.

(56) References Cited

U.S. PATENT DOCUMENTS

| | | | | |
|---|---|---|---|---|
| 11,118,270 | B1 * | 9/2021 | Arumugam | ............ C25D 11/04 |
| 2016/0312374 | A1 * | 10/2016 | Duffy | ..................... C25D 11/06 |
| 2017/0362257 | A1 * | 12/2017 | Venema | ............. C08G 18/4833 |

FOREIGN PATENT DOCUMENTS

| | | | | |
|---|---|---|---|---|
| CN | 110504062 A | * | 11/2019 | ............... H01B 7/28 |
| CN | 112813476 A | * | 5/2021 | ............. C25D 11/24 |
| JP | 2006328467 A | * | 12/2006 | |

OTHER PUBLICATIONS

Machine translation of CN110504062A via EPO, translated Jul. 11, 2025. (Year: 2019).*

(Continued)

*Primary Examiner* — Elizabeth Collister
(74) *Attorney, Agent, or Firm* — HOWARD M COHN and Associates, LLC

(57) ABSTRACT

The present invention provides a self-healing anti-icing ACSR with composite microporous structure, which is formed lower layer pores with a small diameter (durable storage remediator) and upper layer pores with a large diameter (increase a proportion of air cushion to improve anti-icing performance) by growing a uniform porous aluminum membrane on the surface of an aluminum base body. By optimizing the diameter and thickness of the lower layer pores and upper layer pores, and under the action of air pressure, capillary force and surface energy, a low surface energy remediator is immersed in pores, so an anti-icing ACSR with durable excellent anti-icing self-healing performance is prepared. The invention improves the anti-icing performance of the ACSR in practical applications and the self-healing of the anti-icing performance after being damaged, thereby extending the anti-icing life of the ACSR and improving the durable anti-icing performance thereof.

4 Claims, 5 Drawing Sheets

(56)　　　　　References Cited

OTHER PUBLICATIONS

Machine translation of CN112813476A via EPO, translated Jul. 12, 2025. (Year: 2021).*

X.Y. Han, W.Z. Shen, Improved two-step anodization technique for ordered porous anodic aluminum membranes, Journal of Electroanalytical Chemistry, vol. 655, Issue 1, (Year: 2011).*

Machine translation of JP 2006328467 via EPO, translated Jan. 20, 2026 (Year: 2006).*

* cited by examiner

SELF-HEALING ANTI-ICING ALUMINUM CONDUCTOR STEEL-REINFORCED WITH COMPOSITE MICROPOROUS STRUCTURE AND PREPARATION METHOD THEREOF

TECHNICAL FIELD

The present disclosure relates to a technical field of anti-icing materials preparation, and in particular to a self-healing anti-icing aluminum conductor steel-reinforced (ACSR) with composite microporous structure and preparation method thereof.

BACKGROUND

In the present stage, the anti-icing technology is mainly current ice melting, which belongs to passive anti-icing. Special materials used in the anti-icing process, such as super-hydrophobic coatings, super-lubricating anti-icing coatings, and self-heating materials, mainly use anti-icing materials to prevent or delay the surface of conductor from freezing. After freezing, the ice adhesion is low so that the ice is easily removed, or the ice is thermally melted. However, the energy consumption required by the current ice melting process is large, and the power supply needs to be powered off during the ice melting process. In addition, uneven de-icing during the ice melting process is prone to collapse of the tower. The micro-nano structures and low surface energy of traditional superhydrophobic surfaces are extremely fragile, and are prone to structural damage under external physical action, resulting in anti-icing failure. In addition, conventional superhydrophobic surfaces cannot inhibit ice formation in low-temperature and high-humidity environments, such as frost, glaze ice, freezing rain, etc. However, due to the condensation of water vapor into the micro-nano structure, the anti-icing effect is lost, and even gradually develops into a hydrophilic surface, which aggravates the ice coating, and restricts its practical application. At the same time, the traditional coating is not firmly combined with the base body, resulting in a short service life, which also limits the related application prospects. Therefore, further in-depth research on anti-icing materials is required, and it is expected that high-hardness porous compound oxide membrane can be used as superhydrophobic micro-nano structures. Injecting remediator into the pores of the nano-structure to obtain an anti-icing surface with excellent anti-icing performance, good wear resistance and self-healing performance. And composite microporous structure can greatly increase the content of remediator in the pores, effectively improves the anti-icing performance of ACSR and extends its anti-icing life.

SUMMARY

In order to solve the technical problem, the present disclosure provides a self-healing anti-icing ACSR with composite microporous structure and preparation method thereof.

This invention relates to ACSR (aluminum conductor steel-reinforced) conductors. And the shape of the composite microporous can be funnel shaped or other.

To achieve the above object, the present disclosure provides the following technical solutions:

The self-healing anti-icing ACSR with composite microporous structure, the self-healing anti-icing ACSR comprises an aluminum base body, a porous alumina membrane grown on the surface of the aluminum base body, and a low surface energy remediator has modified the surface inside and outside of pores, and stored in the bottom of the pores.

Uniform composite microporous structure has grown on the aluminum base body, the composite microporous structure comprise lower layer pores with a small diameter of 20-200 nm in diameter and 5-50 μm in depth, and upper layer pores with a large diameter of 100-400 nm and 5-50 μm in depth. And the shape of the composite microporous structure can be funnel shaped or other.

Preferably, the aluminum base body is an ACSR.

Further preferably, the aluminum conductor steel-reinforced is any one of an aluminum alloy conductor steel-reinforced (AACSR), an aluminum conductor steel-reinforced (ACSR), an aluminum conductor with aluminum clad steel core (ACSR-AS), an aluminum conductor aluminum alloy reinforced (ACAR) or an aluminum conductor with carbon fiber reinforced composite core (ACCC).

Preferably, the low surface energy remediator is any one of fluorosilane, perfluorooctanoic acid, octadecylamine, stearic acid or perfluorooctyltrimethoxysilane.

Preferably, the porous alumina membrane is an aluminium oxide membrane with funnel shaped microporous structure.

The preparation method of the self-healing anti-icing ACSR, wherein the preparation method adopts two anodic oxidation, and specifically includes the following steps:

(1) First anodic oxidation: the aluminum base body which is washed clean is placed in the anodic oxidation electrolyte as an anode; a ring electrode made of lead plate, aluminum plate, graphite plate or 304 stainless steel plate is a cathode, applied a direct current or pulse current with a current density of 0.02 to 0.3 A/cm$^2$, then, the first anodic oxidation is carried out at a temperature of 0 to 50° C. for 1 to 30 min; and upper layer pores with a small diameter of 20-200 nm in diameter and 5-50 μm in depth can be formed on the surface of the aluminum base body; the electrolyte in the anodizing electrolyte is any one or more of phosphoric acid, sulfuric acid or selenic acid;

(2) Second anodic oxidation: the product obtained in step (1) is placed in the anodic oxidation electrolyte as the anode, and the ring electrode made of lead plate, aluminum plate, graphite plate or 304 stainless steel plate is a cathode, applied a direct current or pulse current with a current density of 0.01 to 0.2 A/cm$^2$, then, the second anodic oxidation is carried out at a temperature of 0 to 50° C. for 1 to 30 min; and lower layer pores with a large diameter of 100-400 nm in diameter and 5-50 μm in depth can be formed on the surface of the aluminum base body and under the upper layer pores; the electrolyte in the anodizing electrolyte is any one or more of oxalic acid, citric acid, chromic acid or tartaric acid;

(3) the product obtained in step (2) is placed in a liquid low surface energy remediator or a solid low surface energy remediator after being heated and melted, and immersed for 10 min to 24 h to make the remediator immersed in the lower layer pores and upper layer pores, the excess low surface energy remediator on the surface can be removed, and then dried it. In this way, the remediator has modified the surface inside and outside of pores, and stored in the bottom of the pores. The self-healing anti-icing ACSR with composite microporous structure can be obtained.

Preferably, in step (1), the cleaning is as follows: firstly, the aluminum base body is washed in clean water, and then placed in a 1 mol/L sodium hydroxide solution for 2 min.

Preferably, in step (1), the concentration of the electrolyte in the anodizing electrolyte is 0.1-0.5 mol/L, and the solvent is water.

Preferably, in step (2), the concentration of the electrolyte in the anodizing electrolyte is 0.1-0.5 mol/L, and the solvent is water.

Preferably, in step (3), placing the product obtained in a low surface energy remediator can also be carried out under vacuum conditions.

Preferably, in step (3), the drying conditions are drying in an oven at 80-120° C.

The self-healing anti-icing ACSR with composite microporous structure provided by the present disclosure has beneficial effects as follows.

The present invention provides the self-healing anti-icing ACSR with composite microporous structure, which is formed lower layer pores with small diameter (durable storage remediator) and upper layer pores with large diameter (increase a proportion of air cushion to improve anti-icing performance) by growing a uniform porous alumina membrane on the surface of an aluminum base body. The ACSR with composite microporous structure of the present invention has the characteristics of high aspect ratio, narrow spacing, and large air cushion ratio, which can solve the problem that ordinary super-hydrophobic surface structure cannot solve the problem of icing in low temperature and high humidity environment, such as frost, glaze ice, freezing rain. It shown that it has excellent anti-icing performance. At the same time, due to the existence of the lower layer pores, which stored much more self-healing agent, improves the self-healing anti-icing performance of the ACSR in practical applications and the self-healing of the anti-icing performance (self-healing speed and times) after being damaged, thereby extending the anti-icing life of the ACSR and improving the durable anti-icing performance thereof. In addition, the invention provides the self-healing anti-icing ACSR with composite microporous structure, which can improve the poor self-healing performance of single pores structure and solve the problems of insufficient remediator content, less self-healing times, short anti-icing life and insufficient wear resistance in single pore structure. Also, it can improve the wear resistance, hardness, toughness and anti-bending cracking performance of the alumina membrane and has a wide application prospect.

In order to more clearly illustrate technical solutions in embodiments of the present disclosure, other advantages, objectives and characteristics in description are following introduced, and to the extent that it is obvious to those skilled in the art based on an examination of the following, or can be taught by practice of the present invention. The objectives and other advantages of the present invention can be realized and attained by the following description.

BRIEF DESCRIPTION OF DRAWINGS

The invention will be further described with reference to the accompanying drawings, from which the object, technical solutions and beneficial effects of the invention will be clearer.

DETAILED DESCRIPTION

Figures 1, 2:
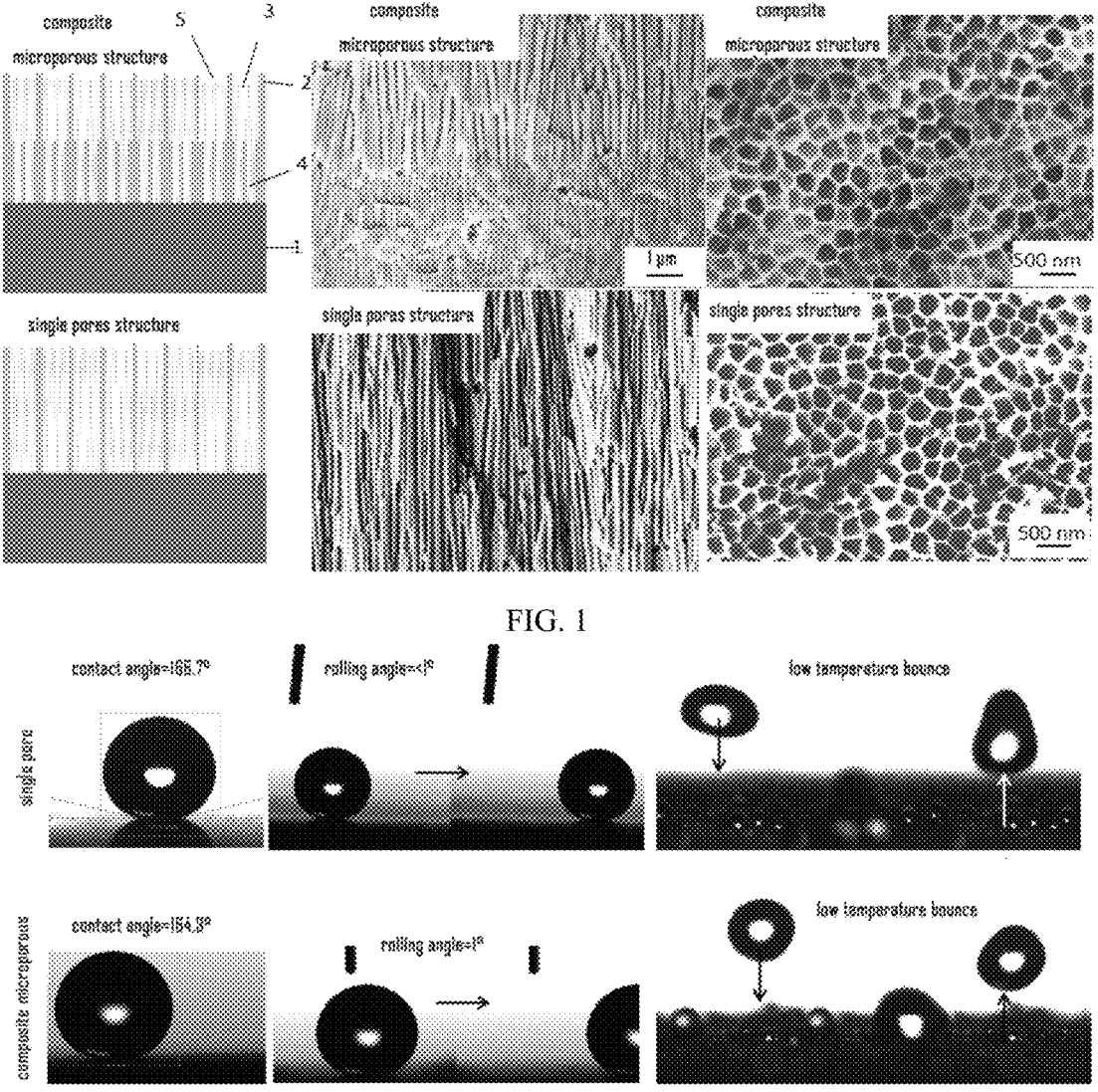
FIG. 1 is a schematic cross-sectional view (a) of an anti-icing ACSR and a ACSR with single pores structure prepared, a cross-sectional view (b) of a scanning electron microscope, and a front view (c) of a scanning electron microscope in Example 1, where 1, aluminum base body aluminum conductor aluminum alloy reinforced (ACAR); 2, porous alumina membrane (aluminium oxide membrane with microporous structure); 3, low surface energy remediator in pores.
FIG. 2 is a water droplet contact angle, rolling angle and low temperature (−8° C.) water droplet bounce of the self-healing anti-icing ACSR with composite microporous structure and the comparative sample (single pores structure) in the Example 1.

The present disclosure will be described in detail with reference to the following specific embodiments, which are used to help those skilled in the art to further understand the present disclosure, and shall not be construed to limit the present disclosure in any form. It would be appreciated by those skilled in the art that changes and modifications can be made in the embodiments without departing from the spirit of the present disclosure, which also belong to the protection scope of the present disclosure. It should be noted that the drawings provided in the following embodiments are only used to illustrate the basic idea of the present invention in a schematic manner, and the following embodiments and features in the embodiments can be combined with each other without conflict.

Example 1

A self-healing anti-icing ACSR with composite microporous structure, which is prepared by two anodic oxidation methods, and specifically includes the following steps:

(1) First anodic oxidation: the aluminum base body (aluminum alloy core ACSR) which is washed clean (the aluminum base body is washed in clean water, and then placed in a 1 mol/L sodium hydroxide solution for 2 min) is placed in a phosphoric acid electrolyte (the concentration of phosphoric acid is 0.3 mol/L, and the solvent is water) as an anode; and a ring electrode made of 304 stainless steel plate is a cathode, applied a direct current with a current density of 0.15 A/cm², then, the first anodic oxidation is carried out at a temperature of 25° C. for 15 min; and upper layer pores with a small diameter of 250 nm in diameter and 26 μm in depth can be formed on the surface of the aluminum base body.

(2) Second anodic oxidation: the product obtained in step (1) as an anode is placed in oxalic acid electrolyte (the concentration of oxalic acid is 0.15 mol/L, and the solvent is water), and a ring electrode made of a lead plate, an aluminum plate, a graphite plate or 304 stainless steel plate is a cathode, applied a direct current with a current density of 0.07 A/cm², then, the second anodic oxidation is carried out at a temperature of 25° C. for 20 min; and lower layer pores with a large diameter of 85 nm in diameter and 15 μm in depth can be formed on the surface of the aluminum base body.

(3) The product obtained in step (2) is immersed in a liquid low surface energy remediator (fluorosilane) under vacuum conditions (−0.1 MPa vacuum for 2 h), immersed for 12 h in vacuum conditions so that the remediator (fluorosilane) is immersed into the lower layer pores and upper layer pores, (the remediator (fluorosilane) is immersed into the lower layer pores and upper layer pores under capillary force and surface energy), blown off the low surface energy remediator on the surface, and then dried (80-120° C. oven) it. In this way, the self-healing anti-icing ACSR with composite microporous structure can be obtained.

Example 2

A self-healing anti-icing ACSR with composite microporous structure, which is prepared by two anodic oxidation methods, and specifically includes the following steps:

(1) First anodic oxidation: the ACAR which is washed clean (the aluminum base body is washed in clean water, and then placed in a 1 mol/L sodium hydroxide solution for 2 min) is placed in a phosphoric acid electrolyte (the concentration of phosphoric acid is 0.3 mol/L, and the solvent is water) as an anode; and a ring electrode made of a lead plate is a cathode, applied a direct current with a current density of 0.2 A/cm², then, the first anodic oxidation is carried out at a temperature of 10° C. for 10 min; and upper layer pores with a large pore diameter of 220 nm in diameter and 20 μm in depth can be formed on the surface of the aluminum base body.

(2) Second anodic oxidation: the product obtained in step (1) as an anode is placed in oxalic acid electrolyte (the concentration of oxalic acid is 0.1 mol/L, and the solvent is water), and a ring electrode made of an aluminum plate is a cathode, applied a direct current with a current density of 0.1 A/cm², then, the second anodic oxidation is carried out at a temperature of 0° C. for 15 min; and lower layer pores with a small diameter of 70 nm in diameter and 25 μm in depth can be formed on the surface of the aluminum base body.

(3) A perfluorooctanoic acid is heated and melted, and the product obtained in step (2) is immersed in a remediator, immersed for 10 min so that the remediator (the perfluorooctanoic acid) is immersed into the lower layer pores and upper layer pores (the perfluorooctanoic acid is immersed into the lower layer pores and upper layer pores under capillary force and surface energy), so the low surface energy remediator (the perfluorooctanoic acid) on the surface can be removed, and then dried (80° C. oven) it. In this way, the self-healing anti-icing ACSR with composite microporous structure is obtained.

Example 3

A self-healing anti-icing ACSR with composite microporous structure, which is prepared by two anodic oxidation methods, and specifically includes the following steps:

(1) First anodic oxidation: the aluminum base body (ACSR-AS) which is washed clean (the aluminum base body is washed in clean water, and then placed in a 1 mol/L sodium hydroxide solution for 2 min) is placed in a phosphoric acid electrolyte (the concentration of phosphoric acid is 0.15 mol/L, and the solvent is water) as an anode; and a ring electrode made of an aluminum plate is a cathode, applied a direct current with a current density of 0.1 A/cm², then, the first anodic oxidation is carried out at a temperature of 50° C. for 25 min; and upper layer pores with a large diameter of 180 nm in diameter and 35 μm in depth can be formed on the surface of the aluminum base body.

(2) Second anodic oxidation: the product obtained in step (1) as an anode is placed in oxalic acid electrolyte (the concentration of oxalic acid is 0.3 mol/L, and the solvent is water), and a ring electrode made of an aluminum plate is a cathode, applied a direct current with a current density of 0.05 A/cm², then, the second anodic oxidation is carried out at a temperature of 30° C. for 30 min; and lower layer pores with a small diameter of 110 nm in diameter and 35 μm in depth can be formed on the surface of the aluminum base body.

The product obtained in step (2) is immersed in fluorosilane, immersed for 24 h so that the remediator is immersed into upper layer pores and lower layer pores, (the fluorosilane is immersed into the upper layer pores and lower layer pores under capillary force and surface energy), so the low surface energy remediator (the fluorosilane) on the surface can be removed, and dried (120° C. oven). In this way, the self-healing anti-icing ACSR with composite microporous structure is obtained.

Example 4

A self-healing anti-icing ACSR with composite microporous structure, which is prepared by two anodic oxidation methods, and specifically includes the following steps:

(1) First anodic oxidation: the aluminum base body (ACCC) which is washed clean (the aluminum base body is washed in clean water, and then placed in a 1 mol/L sodium hydroxide solution for 2 min) is placed in a phosphoric acid electrolyte (the concentration of phosphoric acid is 0.2 mol/L, and the solvent is water) as an anode; and a ring electrode made of a graphite plate is a cathode, applied a direct current with a current density of 0.3 A/cm², then, the first anodic oxidation is carried out at a temperature of 40° C. for 5 min; and upper layer pores with a large diameter of 300 nm in diameter and 10 μm in depth can be formed on the surface of the aluminum base body.

(2) Second anodic oxidation: the product obtained in step (1) as an anode is placed in oxalic acid electrolyte (the concentration of oxalic acid is 0.4 mol/L, and the solvent is water), and a ring electrode made of a lead plate, an aluminum plate, a graphite plate or 304 stainless steel plate is a cathode, applied a direct current with a current density of 0.2 A/cm², then, the second anodic oxidation is carried out at a temperature of 10° C. for 40 min; and lower layer pores with a small pore diameter of 200 nm in diameter and 40 μm in depth can be formed on the surface of the aluminum base body.

Octadecylamine is heated and melted, and the product obtained in step (2) is immersed in the melted octadecylamine, immersed for 10 min so that the remediator (the octadecylamine) is immersed into the lower layer pores and upper layer pores, (the octadecylamine is immersed into the lower layer pores and upper layer pores under capillary force and surface energy), so the low surface energy remediator (the octadecylamine) on the surface can be removed, and dried (100° C. oven) In this way, the self-healing anti-icing ACSR with composite microporous structure is obtained.

In the preparation method except in the examples, in addition to the phosphoric acid used as the electrolyte, sulfuric acid or selenoic acid can also be used as the electrolyte preparing upper layer pores with a small pore diameter. In addition to the oxalic acid used as the electrolyte for preparing an lower layer pores with a large diameter, citric acid, chromic acid or tartaric acid can also be used as the electrolyte. In this way, the self-healing anti-icing ACSR with composite microporous structure can also be prepared.

Performance Tests

1. Structural Test:

Take the self-healing anti-icing ACSR with composite microporous structure prepared in Example 1 as an example to test; a schematic cross-sectional view (a) of an anti-icing ACSR prepared (where 1, aluminum base body (aluminum conductor aluminum alloy reinforced (ACAR)); 2, porous alumina membrane aluminium oxide membrane with microporous structure); 3, low surface energy remediator in pores; 4, lower layer pores with a small diameter; 5, upper layer pores with a large diameter); a cross-sectional view (b) of a scanning electron microscope, and a front view (c) of a scanning electron microscope is shown in FIG. 1. It can be seen that the self-healing anti-icing ACSR with composite microporous structure, which is prepared by the preparation method of the present invention, comprises the aluminum base body, the porous alumina membrane grown on the surface of the aluminum base body, and the low surface energy remediator has modified the surface inside and outside of pores, and stored in the bottom of the pores. Wherein the self-healing anti-icing ACSR with single pores structure as a comparative sample, and the pore diameter of the comparative sample is consistent with upper layer pores diameter of the ACSR with composite microporous structure.

2. Hydrophobic Test:

Take the product prepared in Example 1 as an example to test, the water droplet contact angle, rolling angle and low temperature (−8° C.) water droplet bounce of the self-healing anti-icing ACSR with composite microporous structure prepared in Example 1 are shown in FIG. 2. It can be seen from FIG. 2 that the contact angle of the anti-icing surface is up to 166.7°, the rolling angle is lower than 1°, and at the same time, the water droplets bounce on the anti-icing surface at low temperature (−8° C.). These indicates that the surface has a strong ability to repel water at low temperature, which can prevent water droplets from staying on the surface to freeze. As the comparative simple, the surface contact angle of the self-healing anti-icing ACSR with single pores structure is 164.3°, the rolling angle is 1° and hydrophobicity is worse than composite microporous structure. The surface of the composite microporous structure stores a greater proportion of the air cushion relative to the single pores structure. Therefore, it has better hydrophobicity. In the method of the present invention, the remediator containing low surface energy groups is grafted onto the surface of nano pores by covalent bond to obtain the repaired rough nanoporous ACSR, which can reduce the surface energy of the self-healing anti-icing ACSR prepared and has the superhydrophobic performance.

Figure 3:
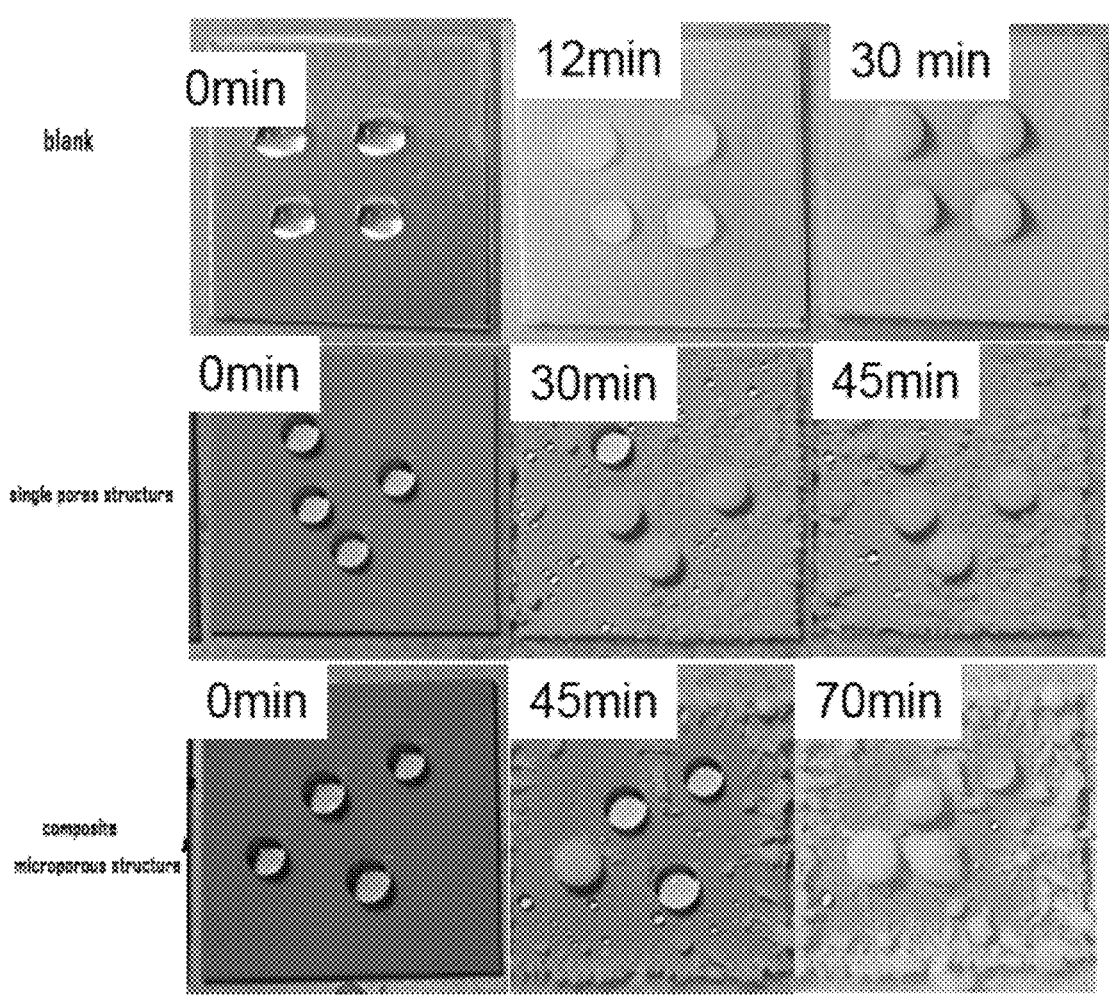
FIG. 3 is a graph of delayed icing (−8° C.) test results for a blank (ordinary anti-icing ACSR), an anti-icing ACSR with single pores structure, and the self-healing anti-icing ACSR with composite microporous structure prepared in the Example 1.

3. Delayed Icing Test:

Cool down the surfaces of three wires to −8° C. (three wires include the blank (ordinary anti-icing ACSR), the self-healing anti-icing ACSR with single pores, and the self-healing anti-icing ACSR with composite microporous structure prepared in Example 1), and observe the freezing time of water droplets. As shown in FIG. 3, the total freezing time of water drops in the blank, single pores structure and composite microporous structure are 12 min, 45 min and 70 min, respectively. It shows that compared with single pores structure, the surface of the composite microporous structure stores more air cushions, so the self-healing anti-icing ACSR with composite microporous structure prepared in Example 1 has very excellent performance of delaying the freezing of water droplets.

Figure 4:
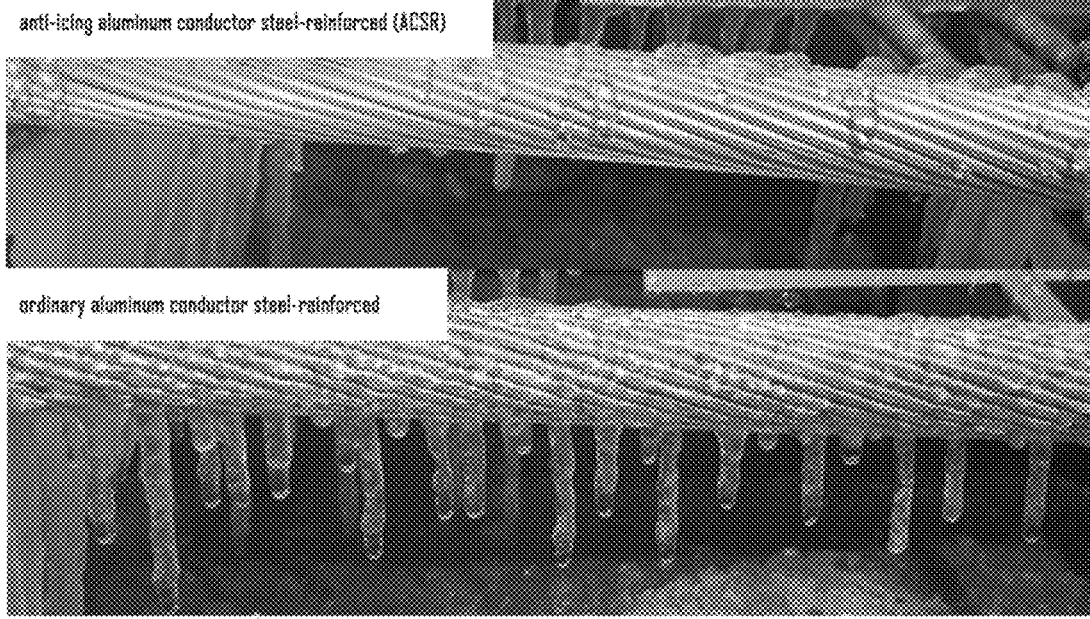
FIG. 4 is a graph showing the results of the rain icing experiment on different ACSR (the self-healing anti-icing ACSR with composite microporous structure prepared and the original unimproved ACSR in the Example 1)

4. Rain Icing Experiment Test:

Taking the self-healing anti-icing ACSR with composite microporous structure and the original unimproved ACSR prepared in Example 1 as examples to test, the rain icing experiment is carried out in an artificial climate laboratory, where the ambient temperature is −8° C., the humidity is 50% to 70%, and the temperature of the super-cooled water droplets is 0° C. to 3° C. After 1 hour of continuous icing, the surface of the untreated ACSR is quickly covered with a dense layer of ice, and the thickness of the ice and the length of the ice edge increase with icing time; However, for the anti-icing overhead ACSR in Example 1 prepared by the method of the present invention, the super-cooled water droplets are easy to bounce off or roll off from the ACSR, and most areas are not frozen, as shown in FIG. 4. The rain icing experiment shows that the amount of ice on the surface of the anti-icing ACSR prepared in Example 1 is significantly less than the blank ACSR, and most areas remain dry, indicating that the anti-icing ACSR has good anti-icing performance.

Figures 5, 6:
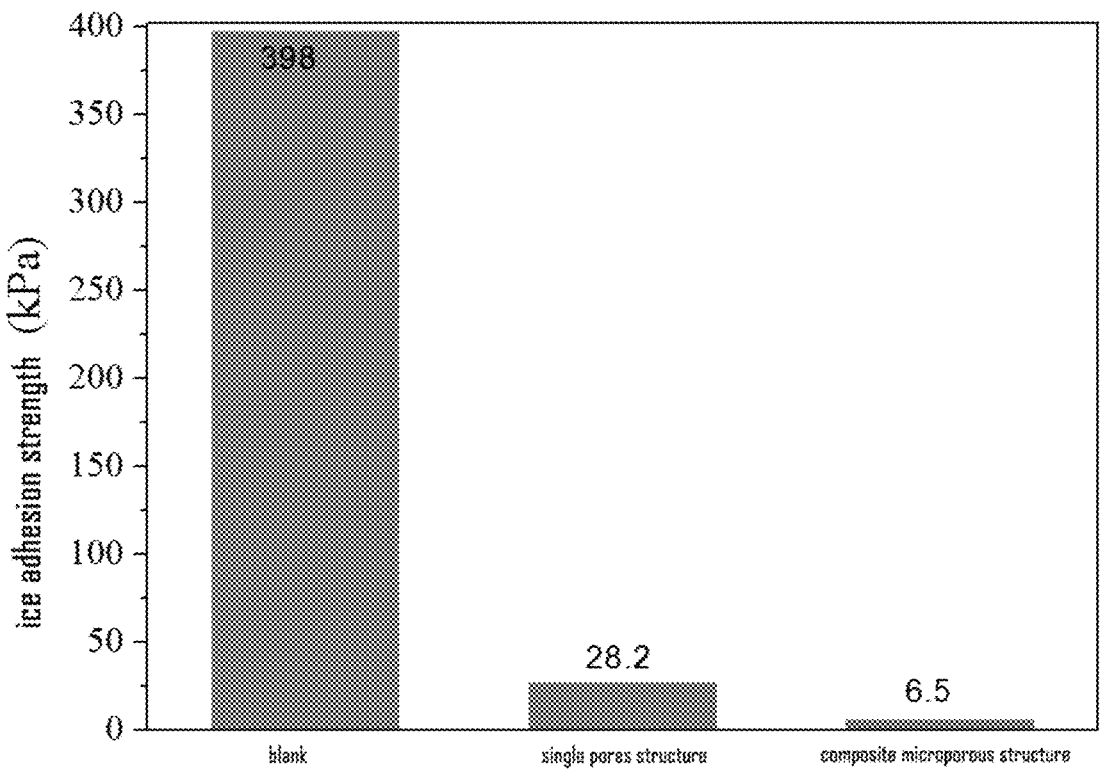
FIG. 5 is a graph showing the ice adhesion strength effect test of the blank (ordinary anti-icing ACSR), the anti-icing ACSR with single pores structure, and the self-healing anti-icing ACSR with composite microporous structure prepared in the Example 1.
FIG. 6 is a cross-sectional energy spectrum of the anti-icing ACSR with single pores structure and the self-healing anti-icing ACSR with composite microporous structure prepared in the Example 1 after injection of remediator.

5. Ice Adhesion Strength Test:

Place the self-healing anti-icing ACSR with composite microporous structure at a temperature of −15° C. and a humidity of 50% to 60% for 12 hours, and use a tensiometer test the ice adhesion strength. The ordinary ACSR (blank) and the ice adhesion strength of the self-healing anti-icing ACSR with composite microporous structure prepared in Example 1 are shown in FIG. 5. Since the surface of Example 1 has a strong ability to discharge water, the water forms an ACSR-air-ice composite interface with the surface after freezing, and the contact area between ice and stranded wire is greatly reduced, so that the ice adhesion can be greatly reduced. The adhesive strength of the anti-icing overhead ACSR prepared in Example 1 is 6.5 kPa, which is only 1.6% of the original ACSR. The single pores structure is 28.2 kPa, which is 7% of the original ACSR. It shows that the self-healing anti-icing ACSR with composite microporous structure prepared in Example 1 has very excellent low ice adhesion performance.

Figure 7:
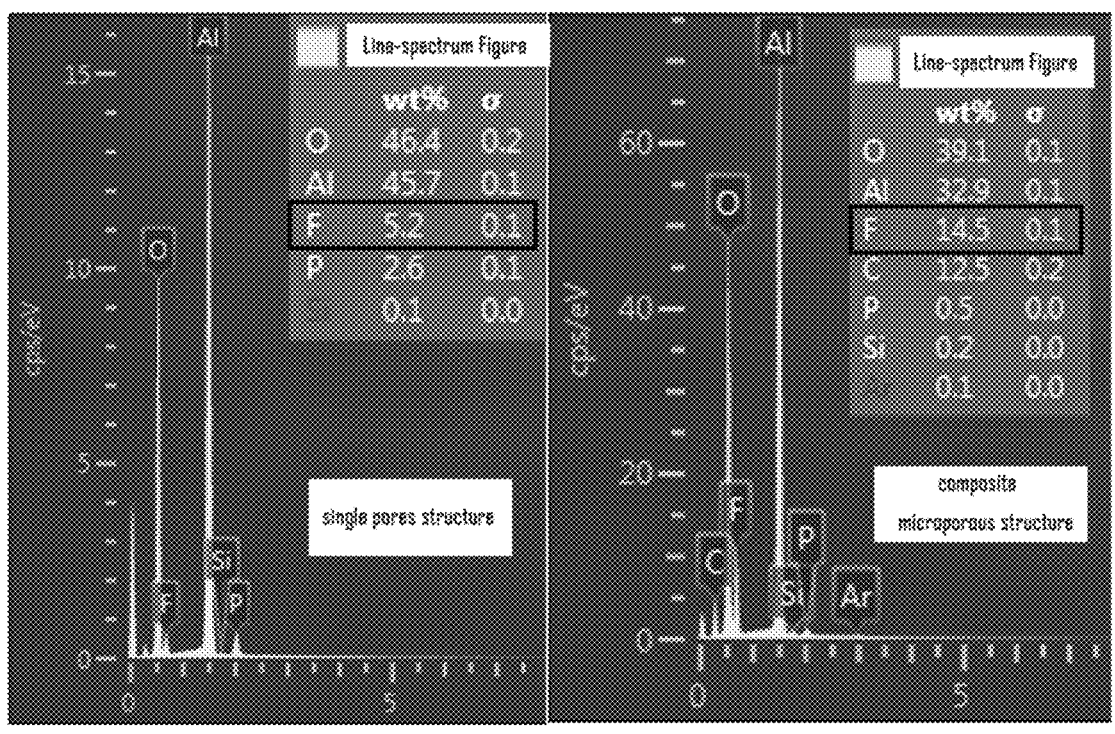
FIG. 7 is a graph showing the change in contact angle after plasma damage and after self-healing of the anti-icing ACSR prepared in the Example 1.

6. Wear Resistance and Self-Healing Performance Test:

FIG. 6 is a cross-sectional energy spectrum of the anti-icing ACSR with single pores structure and the self-healing anti-icing ACSR with composite microporous structure prepared in the Example 1 after the remediator is injected. After plasma is used to damage the surface of anti-icing ACSR with single pores and the surface of anti-icing ACSR prepared in Example 1, the anti-icing surface becomes super-hydrophilic and the contact angle is reduced to about 0°. The anti-icing ACSR prepared in Example 1 is self-healing after being placed at room temperature, and the contact angle and rolling angle return to the damage before, and the self-healing can be repeated for 8 times. After 8 times of self-healing, the contact angle is higher than 160° and the rolling angle is lower than 5°. However, the single pore structure can only be repaired for 6 times. After the seventh repaired, the rolling angle is greater than 10°, and the superhydrophobic performance is lost. This is because there are a lot of remediators stored in the nanoporous structure on the surface of the ACSR. After the surface is damaged, the remediator in the pore migrates to the surface under the action of capillary force and surface energy to repair the surface. FIG. 7 is a graph showing the change in contact angle after plasma damage and after self-healing of the anti-icing ACSR prepared in the Example 1. It can be seen that the anti-icing ACSR with composite microporous structure prepared by the method of the invention has excellent self-healing performance, and the composite microporous structure is superior to the anti-icing ACSR with single pore structure. It can be seen from FIG. 7 that fluorine content in the single pore is 5.2%, while fluorine content in the composite microporous structure is 14.5%, indicating that the composite microporous structure can store more remediators and thus has better self-healing performance.

Figure 8:
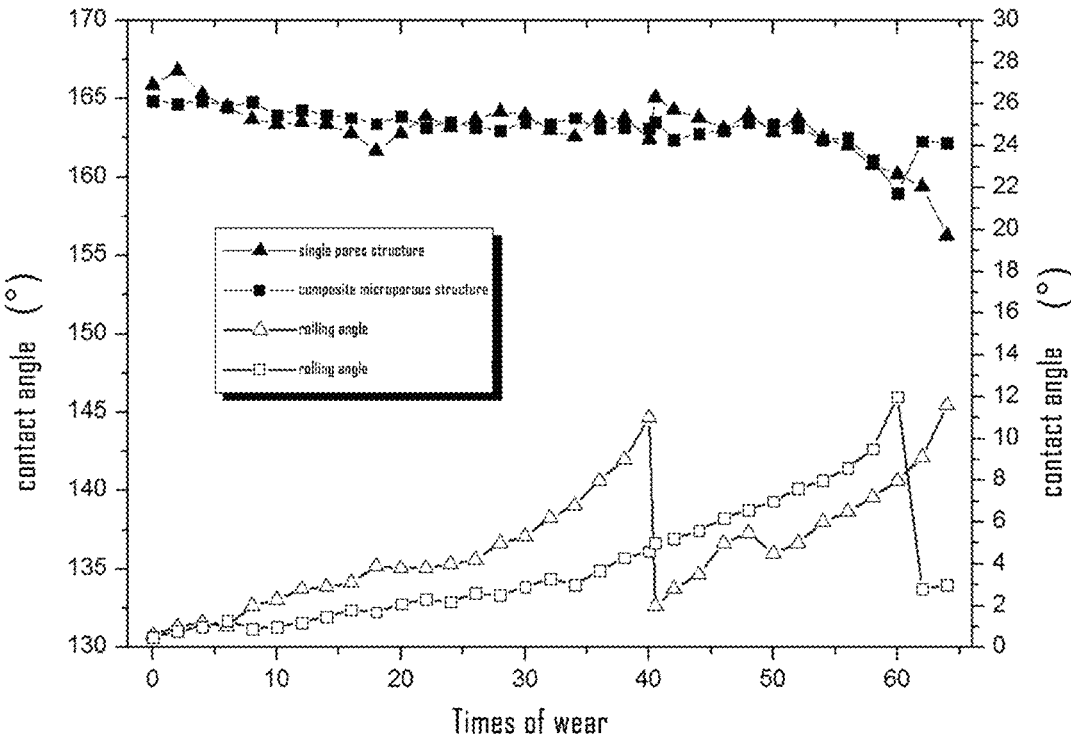
FIG. 8 is shown that the wear resistance and self-healing performance of the anti-icing ACSR with single pores structure and the self-healing anti-icing ACSR with composite microporous structure prepared in the Example 1.
Figure 9:
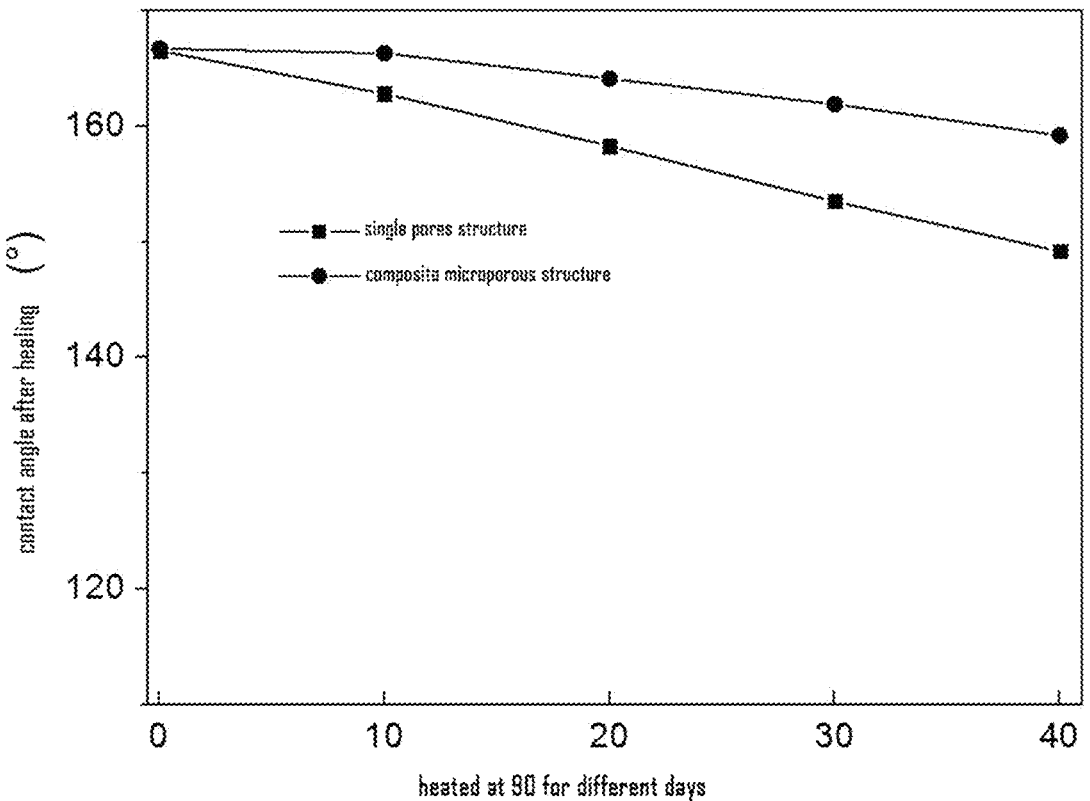
FIG. 9 is a graph showing the change in contact angle of the self-healing anti-icing ACSR prepared in the Example 1 and the anti-icing with single pores structure after being heated at 90° C. for different days.

Use 1000 mesh sandpapers to polish the surface of the self-healing anti-icing ACSR prepared in Example 1, and the applied pressure is 12 kPa. FIG. 8 is shown that the wear resistance and self-healing performance of the anti-icing ACSR with single pores and the anti-icing ACSR prepared in the Example 1. It can be seen from FIG. 8 that the ACSR with single pore structure and the anti-icing ACSR prepared in Example 1 still have a high contact angle and a low rolling angle after being polished with sandpaper for many times. The results show that the anti-icing ACSR has excellent wear resistance, and the rolling angle of single pore is higher than 10° after 40 wear times, while the rolling angle of composite microporous structure surface is more than 10° after 60 wear times. The invention provides that the anti-icing overhead ACSR has good wear resistance, and the wear resistance of the composite microporous structure is higher than the single pore. The single pores structure after 40 times of wear and the composite microporous structure after 70 times of wear are placed in the air for 5 hours or heated at 70° C. for hours, the surface self-healing occurs, and the rolling angle restores and reduces the level of the early wear, indicating that the anti-icing ACSR with composite microporous structure prepared by the invention also has good anti-icing self-healing performance after damage. The life of the remediator for anti-icing ACSR with single pores structure and the self-healing anti-icing ACSR prepared in Example 1 are tested by reheating, and the change of the contact angle after plasma damage-self-healing is shown in FIG. 9. The results of the heat resistance test show that after heating at 90° C., the anti-icing ACSR with single pores structure is damaged by oxygen plasma and the contact angle is decreased after self-healing, indicating that the remediator is lost during the heat resistance process.

However, the contact angle reduction rate of the composite microporous structure prepared in Example 1 is much lower than the single pore. The ACSR with composite microporous structure on the surface has better heat-resistant and self-healing durability, because the small pore at the bottom of composite microporous structure can prevent the loss of remediator.

Figure 10:
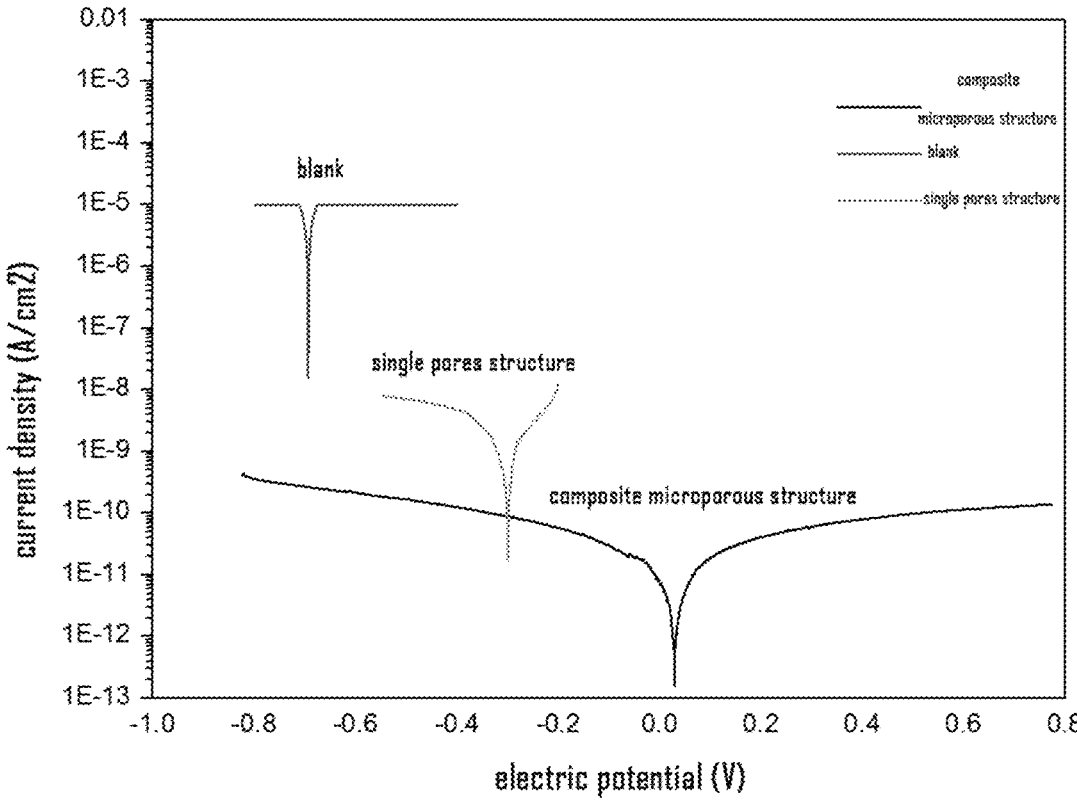
FIG. 10 is the corrosion Tafel curve of blank (ordinary anti-icing ACSR), anti-icing ACSR with single pores structure and self-healing anti-icing ACSR with composite microporous structure prepared in the Example 1.

7. Corrosion Resistance Performance Test:

An electrochemical polarization curve is used to test the corrosion resistance of different anti-icing ACSR, and the corrosion Tafel curve of blank (ordinary anti-icing ACSR), anti-icing ACSR with single pores structure and self-healing anti-icing ACSR with composite microporous structure prepared in the Example 1 are shown in FIG. 10. The results show that the corrosion currents are in the following order: the self-healing anti-icing ACSR with composite microporous structure in Example 1<the anti-icing ACSR with single pores structure<blank (ordinary anti-icing ACSR); the corrosion potentials are in the following order: the self-healing anti-icing ACSR with composite microporous structure in Example 1>the anti-icing ACSR with single pores structure>blank (ordinary anti-icing ACSR); the corrosion resistance performance is in the following order: the self-healing anti-icing ACSR with composite microporous structure in Example 1>the anti-icing ACSR with single pores structure>blank (ordinary anti-icing ACSR). Therefore, the self-healing anti-icing ACSR with composite microporous structure of the present invention has excellent corrosion resistance, and can prevent acid rain, corrosive gas and other corrosion.

After testing, it is found that the performance of the self-healing anti-icing ACSR with composite microporous structure prepared in other examples is similar to the self-healing anti-icing ACSR with composite microporous structure prepared in Example 1.

The low surface energy remediator is any one of the fluorosilane, the perfluorooctanoic acid, the octadecylamine, the stearic acid or perfluorooctyltrimethoxysilane; the electrolyte in the anodizing electrolyte is any one or more of oxalic acid, citric acid, chromic acid or tartaric acid; the electrolyte in the anodizing electrolyte is any one or more of oxalic acid, citric acid, chromic acid or tartaric acid; all of them have the same performance of hydrophobic, anti-icing and healing as the self-healing anti-icing ACSR with composite microporous structure prepared in the embodiment.

In summary, the present invention provides the self-healing anti-icing ACSR with composite microporous structure, which is formed lower layer pores with small diameter (durable storage remediator) and upper layer pores with large diameter (increase a proportion of air cushion to improve anti-icing performance) by growing a uniform porous alumina membrane on the surface of an aluminum base body. By optimizing the diameter and thickness of the small pores (lower layer pores) and large pores (upper layer pores), and under the action of air pressure, capillary force and surface energy, the low surface energy remediators are immersed in pores, so an anti-icing aluminum wire with durable excellent anti-icing self-healing performance is prepared. The present invention improves the anti-icing performance of the ACSR in practical applications and the self-healing of the anti-icing performance after being damaged, thereby extending the anti-icing life of the ACSR and improving the durable anti-icing performance thereof. The invention provides the self-healing anti-icing ACSR with composite microporous structure, which can improve the wear resistance, hardness, toughness and anti-bending cracking performance of the membrane compared with a single oxide membrane due to the combination of two different oxide membranes.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A self-healing anti-icing aluminum stranded conductor with a composite microporous structure, comprising:

an aluminum base;

a porous alumina membrane formed on a surface of the aluminum base; and a low surface energy remediator filled in pores defined in the porous alumina membrane;

wherein the porous alumina membrane on the on the aluminum base forms a uniform composite micropo-rous structure, and wherein the composite microporous structure comprises an inner layer of pores with rela-tively small diameters of 26-200 nm and depths of 5-50 µm, and an outer layer of pores with relatively large diameters of 200-400 nm in diameter and depths of 5-50 µm; wherein the outer layer of pores each have a larger diameter than the inner layer of pores; wherein the inner layer of pores having relatively small diam-eters is configured to retain the low surface energy remediator for durable self-healing, and wherein the outer layer of pores having relatively large diameters is configured to provide an increased proportion of air cushion to enhance anti-icing performance of the self-healing anti-icing aluminum;

wherein the low surface energy remediator is any one of perfluorooctanoic acid, octadecylamine, or perfluo-rooctyltrimethoxysilane.

2. The self-healing anti-icing aluminum stranded conduc-tor of claim 1, wherein the aluminum base body is an ACSR.

3. The self-healing anti-icing aluminum stranded conduc-tor of claim 2, wherein the aluminum stranded conductor is any one of an aluminum alloy stranded conductor, a steel core aluminum stranded conductor, an aluminum stranded conductor with aluminum clad steel core, an aluminum stranded conductor with a aluminum alloy core or an alu-minum conductor with a carbon fiber composite core.

4. The self-healing anti-icing aluminum stranded conduc-tor of claim 1, wherein the porous alumina membrane is an aluminum oxide membrane with microporous structure.

* * * * *